United States Patent
Prokhorov

(10) Patent No.: US 9,928,833 B2
(45) Date of Patent: Mar. 27, 2018

(54) VOICE INTERFACE FOR A VEHICLE

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/073,288

(22) Filed: Mar. 17, 2016

(65) Prior Publication Data
US 2017/0270916 A1    Sep. 21, 2017

(51) Int. Cl.
| | |
|---|---|
| G10L 21/00 | (2013.01) |
| G10L 15/18 | (2013.01) |
| G10L 15/22 | (2006.01) |
| G06F 3/16 | (2006.01) |
| G10L 15/30 | (2013.01) |
| G10L 15/26 | (2006.01) |

(52) U.S. Cl.
CPC .......... *G10L 15/1822* (2013.01); *G06F 3/167* (2013.01); *G10L 15/22* (2013.01); *G10L 15/265* (2013.01); *G10L 15/30* (2013.01); *G10L 2015/223* (2013.01)

(58) Field of Classification Search
CPC ....... G10L 15/30; G10L 15/22; G10L 15/265; G10L 13/07; G10L 13/08; G10L 13/043; G10L 17/005; G10L 17/26; G10L 21/32; G10L 15/063; G10L 15/20; G10L 25/78
See application file for complete search history.

(56) References Cited

U.S. PATENT DOCUMENTS

| | | |
|---|---|---|
| 4,532,648 A | 7/1985 | Noso et al. |
| 4,593,403 A | 6/1986 | Kishi et al. |
| 4,827,520 A | 5/1989 | Zeinstra |
| 8,428,811 B2 | 4/2013 | Cahill et al. |

(Continued)

OTHER PUBLICATIONS

Michael Andronico, "AT&T Lets You Voice Control Your Home From Your Car", retrieved from the Internet: <http://www.tomsguide.com/us/att-innovation-showcase,news-20903.html>, retrieved Jul. 7, 2015, dated May 8, 2015 (6 pages).

*Primary Examiner* — Vu B Hang
(74) *Attorney, Agent, or Firm* — Christopher G. Darrow; Darrow Mustafa PC

(57) ABSTRACT

The processing of voice inputs includes receiving a voice input from a user. The received voice input can be analyzed to determine whether the voice input includes at least one of human-intended content or machine-intended content. Responsive to determining that the voice input includes human-intended content, a human recipient for the human-intended content can be identified within the voice input, and a message can be sent to the identified human recipient. The message can include the human-intended content in an audio form. Responsive to determining that the voice input includes machine-intended content, a machine recipient for the machine-intended content can be identified within the voice input, and a message including the machine-intended content can be sent to the identified machine recipient to implement the machine-intended content.

25 Claims, 3 Drawing Sheets

(56) References Cited

U.S. PATENT DOCUMENTS

| | | | |
|---|---|---|---|
| 8,639,513 B2* | 1/2014 | Opaluch | G10L 15/265 |
| | | | 704/201 |
| 8,654,936 B1 | 2/2014 | Eslambolchi et al. | |
| 8,947,220 B2 | 2/2015 | Martin et al. | |
| 9,472,205 B2* | 10/2016 | Kolavennu | G10L 21/16 |
| 2005/0035855 A1* | 2/2005 | Sarnowsky | G08C 17/00 |
| | | | 340/531 |
| 2006/0012884 A1 | 1/2006 | Snorteland et al. | |
| 2007/0073543 A1 | 3/2007 | Hammler et al. | |
| 2008/0133230 A1 | 6/2008 | Herforth | |
| 2008/0161988 A1 | 7/2008 | Oesterling et al. | |
| 2008/0208403 A1 | 8/2008 | Bertosa et al. | |
| 2008/0269978 A1 | 10/2008 | Shirole et al. | |
| 2009/0024707 A1* | 1/2009 | Aase | G10L 15/26 |
| | | | 709/206 |
| 2009/0070034 A1 | 3/2009 | Oesterling et al. | |
| 2009/0177354 A1 | 7/2009 | Agrawal et al. | |
| 2010/0076644 A1 | 3/2010 | Cahill et al. | |
| 2012/0274459 A1 | 11/2012 | Jaisimha et al. | |
| 2013/0191132 A1 | 7/2013 | Tanaka | |
| 2013/0278769 A1 | 10/2013 | Nix et al. | |
| 2013/0332004 A1 | 12/2013 | Gompert et al. | |
| 2014/0142948 A1* | 5/2014 | Rathi | G06F 3/167 |
| | | | 704/270.1 |

\* cited by examiner

VOICE INTERFACE FOR A VEHICLE

FIELD

The subject matter described herein relates in general to vehicles and, more particularly, to the interaction between a human and a vehicle.

BACKGROUND

While driving a vehicle, a driver may wish to note one or more things (e.g., a less-than satisfactory behavior of the vehicle or other issue associated with the vehicle) or take some other action (e.g., order dinner). However, it may be difficult for the driver to do so because he or she must concentrate on driving. Accordingly, the driver must remember to do so at the appropriate time. A driver can do so by making a mental note, or the driver can write a note on a piece of paper. Further, a driver may record a voice message for himself or herself. Such techniques can help the driver to subsequently recall what he or she intended to do.

SUMMARY

In one respect, the subject matter described herein relates to a method of processing voice inputs. The method can include receiving a voice input from a user. The method can include analyzing the received voice input to determine whether the voice input includes at least one of human-intended content or machine-intended content. The analyzing can be performed by a processor. The method can further include, responsive to determining that the voice input includes human-intended content, identifying within the voice input a human recipient for the human-intended content, and sending a message to the identified human recipient or causing such a message to be sent. The message can include the human-intended content in an audio form. The method can also include, responsive to determining that the voice input includes machine-intended content, identifying within the voice input a machine recipient for the machine-intended content; and sending a message including the machine-intended content to the identified machine recipient to implement the machine-intended content or causing such a message to be sent.

In another respect, the subject matter described herein relates to a system for processing a voice input system. The system includes a voice interface configured to receive voice inputs from a human user. The voice interface includes one or more microphones. The system also includes one or more processors operatively connected to receive voice inputs from the voice interface. The one or more processors can be programmed to initiate executable operations. The executable operations include analyzing a received voice input to determine whether the voice input includes at least one of human-intended content or machine-intended content. The executable operations, in response to determining that the voice input includes human-intended content, identifying within the voice input a human recipient for the human-intended content, and sending a message to the identified human recipient or causing such a message to be sent. The message can include the human-intended content in an audio form. The executable operations, in response to determining that the voice input includes machine-intended content, identifying within the voice input a machine recipient for the machine-intended content, and sending a message including the machine-intended content to the identified machine recipient to implement the machine-intended content.

In still another respect, the subject matter described herein relates to a vehicle. The vehicle includes a voice interface located onboard the vehicle. The voice interface can be configured to receive voice inputs. The voice interface can include one or more microphones. The vehicle can include a processor operatively connected to receive voice inputs from the voice interface. The processor can be programmed to initiate executable operations. The executable operations can include receiving a voice input from the voice interface. The executable operations can include analyzing the received voice input to determine whether the voice input includes at least one of human-intended content or machine-intended content. Such analyzing can be performed using natural language processing. The executable operations can include, responsive to determining that the voice input includes human-intended content, identifying within the voice input a human recipient for the human-intended content, generating an audio file including the human intended content of the voice input, and sending a message to the identified human recipient or causing such a message to be sent. The message can include the audio file. The human intended content is not converted to text. The executable operations can include, responsive to determining that the voice input includes machine-intended content, identifying within the voice input a machine recipient for the machine-intended content, converting the machine intended content into a format that is compatible for processing by the identified machine recipient, and sending a message including the converted machine-intended content to the identified machine recipient to implement the machine-intended content or causing such a message to be sent.

In still another respect, the subject matter described herein relates to a computer program product for processing voice inputs. The computer program product includes a computer readable storage medium having program code embodied therein. The program code can be executed by a processor to perform a method. The method includes analyzing a received voice input to determine whether the voice input includes at least one of human-intended content or machine-intended content. The method includes, responsive to determining that the voice input includes human-intended content, identifying within the voice input a human recipient for the human-intended content, and sending a message to the identified human recipient, the message including the human-intended content in an audio form. The method includes, responsive to determining that the voice input includes machine-intended content, identifying within the voice input a machine recipient for the machine-intended content, and sending a message including the machine-intended content to the identified machine recipient to implement the machine-intended content.

DETAILED DESCRIPTION

Arrangements presented herein can enable a user to provide voice inputs for human and/or machine recipients. A voice input received from a user can be analyzed to determine whether the voice input includes human-intended content and/or machine-intended content. If it is determined that the voice input includes human-intended content, a human recipient for the human-intended content can be identified within the voice input, and a message can be sent to the identified human recipient. The message can include the human-intended content in an audio form. If it is determined that the voice input includes machine-intended content, a machine recipient for the machine-intended content can be identified within the voice input, and a message including the machine-intended content can be sent to the identified machine recipient to implement the machine-intended content. Arrangements described herein can enhance the convenience of a vehicle by facilitating user interaction with the vehicle. Arrangements here can enable drivers to interact with the vehicle and the external world (e.g., with other persons and/or machines) while allowing a driver to keep focused on the primary task of driving.

Figure 2:
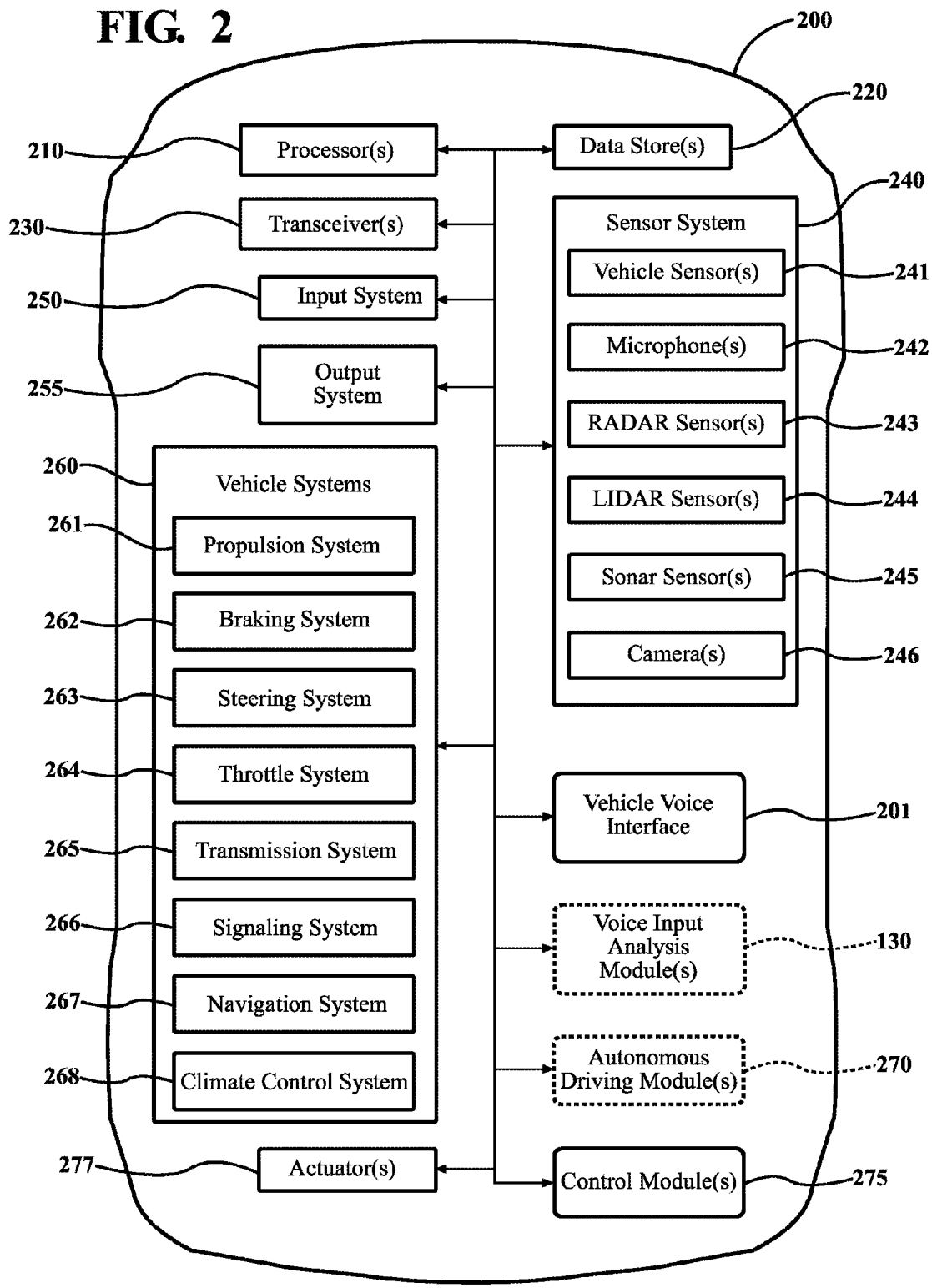
FIG. 2 is an example of a vehicle configured with a voice interface.
Figure 3:
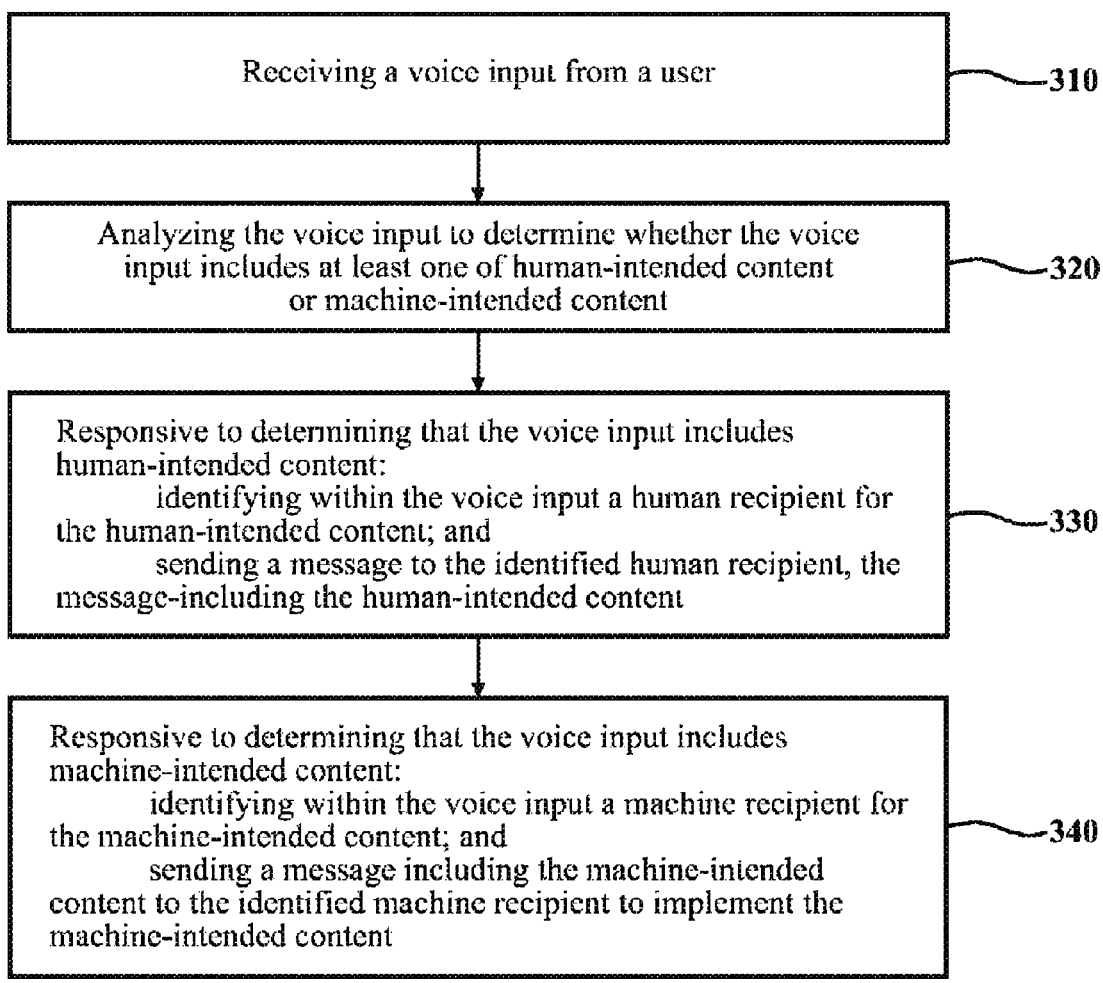
FIG. 3 is an example of a method of processing voice inputs.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
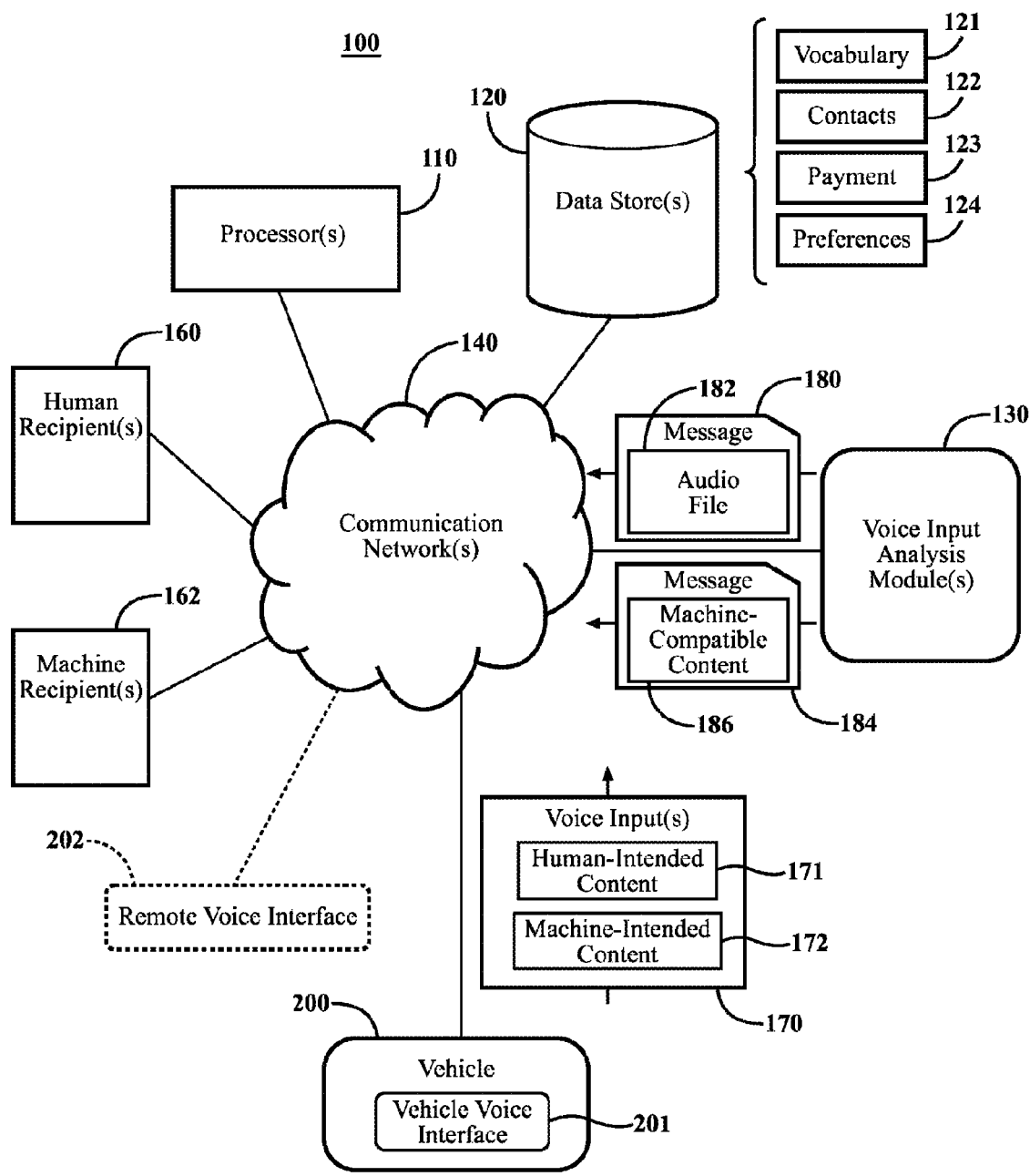
FIG. 1 is an example of a system for processing voice inputs.

FIG. 1 is an example of a system 100 for processing voice inputs. Some of the possible elements of the system 100 are shown in FIG. 1 and will now be described. It will be understood that it is not necessary for the system 100 to have all of the elements shown in FIG. 1 or described herein. The system 100 can include a one or more processors 110, one or more data stores 120, one or more voice input analysis modules 130, a vehicle 200 including a vehicle voice interface 201, one or more human recipients 160, and/or one or more machine recipients 162. In some arrangements, the system 100 can include one or more remote voice interface(s) 202, which includes one or more voice interfaces located remote from the vehicle. In one or more arrangements, the remote voice interface 202 can be provided by and/or as a part of a portable communication device (e.g., a smart phone, a cellular telephone, a tablet, a phablet, etc.) that is communicatively linked to the vehicle voice interface 201 in any suitable manner. "Voice interface" is any component or group of components that enable a user provide inputs to a machine by speaking aloud.

The various elements of the system 100 can be communicatively linked through one or more communication networks 140. As used herein, the term "communicatively linked" can include direct or indirect connections through a communication channel or pathway or another component or system. A "communication network" means one or more components designed to transmit and/or receive information from one source to another.

The one or more communication networks 140 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 140 further can be implemented as or include one or more wireless networks, whether short or long range. For example, in terms of short range wireless networks, the communication network 140 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 140 can include a mobile, cellular, and or satellite-based wireless network and support voice, video, text, and/or any combination thereof. Examples of long range wireless networks can include GSM, TDMA, CDMA, WCDMA networks or the like. The communication network 140 can include wired communication links and/or wireless communication links. The communication network 140 can include any combination of the above networks and/or other types of networks. The communication network 140 can include one or more routers, switches, access points, wireless access points, and/or the like.

One or more elements of the system include and/or can execute suitable communication software, which enables two or more of the elements to communicate with each other through the communication network 140 and perform the functions disclosed herein. For instance, the vehicle voice interface 201 can receive one or more voice inputs 170 from one or more users. The received voice input(s) 170 can be sent or otherwise provided to the voice input analysis module(s) 130, the data store(s) 120, and/or the processor(s) 110.

As noted above, the system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

In one or more arrangements, one or more processors 110 can be located onboard the vehicle 200. In one or more arrangements, one or more processors 110 can be located remote from the vehicle 200. For instance, one or more processors 110 can be a remote server or part of a remote server. In one or more arrangements, one or more of the processors 110 can be located onboard the vehicle 200, and one or more of the processors 110 can be located remote from the vehicle 200.

The system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

In one or more arrangements, one or more data stores 120 can be located onboard the vehicle 200. In one or more arrangements, one or more data stores 120 can be located remote from the vehicle 200. In one or more arrangements, one or more data stores 120 can be located onboard the vehicle 200, and one or more data stores 120 can be located remote from the vehicle 200.

The one or more data stores 120 can include any suitable type of data or information. Non-limiting examples of such data or information include vocabulary data 121, contacts data 122, payment data 123, and/or preferences data 124, just to name a few possibilities. Each of these types of data will be described in turn below.

The vocabulary data 121 can be any data or information relating to words that are recognized by the voice input analysis module(s). In one or more arrangements, the vocabulary data 121 can be a limited vocabulary, that is, it is a subset of a relevant language. In one or more arrangements, the vocabulary data 121 can be a substantially complete language. The vocabulary data 121 can include one or more dictionaries, now known or later developed. The vocabulary data 121 can include noun(s), verb(s), adjective(s), adverb(s), and/or other types of words. The vocabulary data 121 can include words that are commonly expected to be used. In one or more arrangements, the vocabulary data 121 can be predefined by a user or entity (e.g., a manufacturer, etc.). In one or more arrangements, the vocabulary data 121 can be modifiable by a user to delete words, add words, or other modification.

The contacts data 122 can include one or more human contacts and/or one or more machine contacts. Each contact can have information associated with it. For instance, each contact may have one or more recipient indicators associated with it. The recipient indicator can be any suitable identifier, such as one or more names (e.g., first name, last name, nickname, etc.), initials, letters, numbers, words, phrases, other identifiers, and/or combinations thereof. The contacts data 122 can include information about how each person can be contacted (e.g., telephone number, email address, home address, etc.). The contacts data 122 can include preference information for each user. Such preferences can include the preferred manner of contact, a preferred audio file format (as will be explained in greater detail later), accepted machine readable formats, etc.

The payment data 123 can include a user's payment information. For instance, it can include credit card information, bank account information, online wallet information, or other form of payment. In some instances, payment data 123 can be associated with one or more of the contacts.

The preferences data 124 can include a user's preferences for particular things. As an example, it can include a user's clothing size (e.g., for shirts, pants, and/or shows), dining preferences (e.g., particular restaurants, particular meals, particular drinks, etc.). In some instances, the preferences data 124 can be associated with one or more of the individual contacts in the contacts data 122. For instance, one of the contacts in the contacts data 122 can be a particular pizzeria (e.g., Pizza Place X). A user can indicate a preferred type of pizza (e.g. cheese and pepperoni, thin crust, etc.), condiments (e.g., crushed red pepper flakes, etc.), and/or beverages (e.g., diet soft drink only).

The voice input analysis module(s) 130 and/or the data store(s) 120 can be components of the processor(s) 110. In one or more arrangements, the voice input analysis module(s) 130 and/or the data store(s) 120 can be stored on, accessed by and/or executed on the processor(s) 110. In one or more arrangements, the voice input analysis module(s) 130 and/or the data store(s) 120 can be executed on and/or distributed among other processing systems to which the processor(s) 110 is communicatively linked. For instance, at least a portion of the voice input analysis module(s) 130 can be located onboard the vehicle 200. In one or more arrangements, a first portion of the voice input analysis module(s) 130 can be located onboard the vehicle 200, and a second portion of the voice input analysis module(s) 130 can be located remote from the vehicle 200 (e.g., on a cloud-based server, a remote computing system, and/or the processor(s) 110). In one or more arrangements, the voice input analysis module(s) 130 can be located remote from the vehicle 200.

The voice input analysis module(s) 130 can be implemented as computer readable program code that, when executed by a processor, implement one or more of the various processes described herein. The voice input analysis module(s) 130 can be a component of one or more of the processor(s) 110 or other processor(s) (e.g., one or more processors(s) 210 of the vehicle 200 (see FIG. 2), or the voice input analysis module(s) 130 can be executed on and/or distributed among other processing systems to which one or more of the processor(s) 110 is operatively connected. In one or more arrangements, the voice input analysis module(s) 130 can include artificial or computational intelligence elements, e.g., neural network, fuzzy logic or other machine learning algorithms.

The voice input analysis module(s) 130 can include instructions (e.g., program logic) executable by a processor. Alternatively or in addition, one or more of the data stores 120 may contain such instructions. Such instructions can include instructions to execute various functions and/or to transmit data to, receive data from, interact with, and/or control: one or more elements of the system 100. Such instructions can enable the various elements of the system 100 to communicate through the communication network 140.

The voice input analysis module(s) 130 can analyze any voice input(s) 170 received by the vehicle voice interface 201. In one or more arrangements, the voice input (s) 170 can be received directly from one or more vehicle occupant(s) of the vehicle 200. The voice input(s) 170 can include any audio data spoken, uttered, exclaimed, pronounced, exclaimed, vocalized, verbalized, voiced, emitted, articulated, and/or stated aloud by a vehicle occupant. The voice input(s) 170 can include one or more letters, one or more words, one or more phrases, one or more sentences, one or more numbers, one or more expressions, and/or one or more paragraphs, just to name a few possibilities.

The voice input(s) 170 can be sent to, provided to, and/or otherwise made accessible to the voice input analysis module(s) 130. The voice input analysis module(s) 130 can be configured to analyze the voice input(s) 170. The voice input analysis module(s) 130 can analyze the voice input(s) 170 in various ways. For instance, the voice input analysis module(s) 130 can analyze the voice input(s) 170 using any known natural language processing system or technique. Natural language processing can includes analyzing each user's notes for topics of discussion, deep semantic relationships and keywords. Natural language processing can also include semantics detection and analysis and any other analysis of data including textual data and unstructured data. Semantic analysis can include deep and/or shallow semantic analysis. Natural language processing can also include discourse analysis, machine translation, morphological segmentation, named entity recognition, natural language understanding, optical character recognition, part-of-speech tagging, parsing, relationship extraction, sentence breaking, sentiment analysis, speech recognition, speech segmentation, topic segmentation, word segmentation, stemming and/or word sense disambiguation. Natural language processing can use stochastic, probabilistic and statistical methods.

A user can provide a voice input 170 using free form speech so that the user does not have to be concerned about how he or she speaks. The voice input(s) 170 can be analyzed according to a predefined limited language, such as using the vocabulary data 121 in the data store(s) 120. The voice input analysis module can look for certain key words. In some arrangements, words in the received voice input 170 that are not included in the vocabulary data 121 can be ignored or filtered for purposes of analysis. However, such words may still be retained and sent to the intended recipient(s).

The voice input analysis module(s) 130 can analyze the voice input(s) 170 to detect whether it includes human-intended content 171 and/or machine-intended content 172. The voice input analysis module(s) 130 can analyze the voice input(s) 170 in real-time. As used herein, the term "real-time" means a level of processing responsiveness that a user or system senses as sufficiently immediate for a particular process or determination to be made, or that enables the processor to keep up with some external process. However, the analysis of the voice input(s) 170 can be performed in non-real-time. "Non-real-time" or "not in real-time" means a level of processing responsiveness that a user or system would not sense as sufficiently immediate for a particular process or determination to be made, or that does not enable the processor to keep up with some external process.

The voice input analysis module(s) 130 can be configured to analyze the received voice input(s) 170 to detect whether human-intended content 171 and/or machine-intended content 172 is included therein. "Human-intended content" means any message, note, instructions, commands, guidance, comments, remarks, advice, directions, orders, and/or other content that is intended for use, listening, consumption, and/or understanding by one or more persons. "Machine-intended content" means any commands, instructions, directions, directives, orders, and/or other content that is intended for processing, implementing, and/or executing on and/or by one or more machines.

If any the human-intended content 171 is detected in the voice input(s) 170 by the voice input analysis module(s) 130, the detected human-intended content 171 can be included in a message 180 to one or more human recipients 160 identified in the received voice input(s) 170. The human-intended content 171 can be included in the message 180 as an audio file 182.

If it is determined that at least a portion of the voice input is intended for a human user, then that portion of the voice input can be converted/stored as an audial file (e.g., MP3, way, ogg, gsm, dct, or other audio format, now known or later developed). It is not converted to text. The audio file can be sent to the intended recipient in a message (e.g., email, text message, etc.).

If any the machine-intended content 172 is detected in the voice input(s) 170 by the voice input analysis module(s) 130, the detected machine-intended content 172 can be included in a message 184 to one or more machine recipients 162 identified in the received voice input(s) 170. The machine recipient(s) 162 can be any machine. For instance, in one or more arrangements, the machine recipient 162 can be the vehicle 200. Other examples of the machine recipient 162 include a computer controlled house, a computer controlled system (e.g., an automotive vehicle), computer-controlled appliance, and/or a computer at a business (e.g., a restaurant, a grocer, a retailer, etc.), just to name a few possibilities. The machine-intended content 172 can be included in the message 184 as machine-compatible content 186 (e.g., in a format that can be processed by the machine recipient 162). Any suitable conversion or reformatting of the machine-intended content 172 can be performed so that it is in a form that can be processed by the intended machine recipient for implementation.

The voice input analysis module(s) 130 can be configured to analyze the voice input(s) 170 to identify the human recipient(s) of the human-intended content 171 and/or the machine recipient(s) of the machine-intended content 172. In some instances, the voice input analysis module(s) 130 can be configured to analyze the voice input(s) 170 to detect a particular recipient indicator or identifier for a machine recipient and/or a human recipient therein. The recipient indicator may be name(s), word(s), phrase(s), letter(s), number(s), and/or combinations thereof, just to name a few possibilities. The recipient indicator can be assigned by a vehicle occupant, a vehicle owner, or some other entity.

In some instances, the vehicle voice interface 201 can be configured to continuously listen for all voice inputs 170. In such case, all voice inputs or other sound inputs can be received. However, in some instances, the vehicle voice interface 201 can be in an inactive or standby mode. In such a mode, the vehicle voice interface 201 can fully activate in response to receiving a predetermined activation identifier. The activation identifier can be spoken by a person or by a person providing some other input (e.g., pressing a button). For example, the user may utter the word "activate" or "wake-up." When the vehicle voice interface 201 is in an activated mode, it can acquire all voice inputs provided by a user.

The vehicle 200 will now be described in greater detail. Referring to FIG. 2, an example of the vehicle 200 is shown. The vehicle 200 can be any suitable type of vehicle. As used herein, "vehicle" means any form of motorized transport. In one or more implementations, the vehicle 200 can be an automobile. While arrangements will be described herein with respect to automobiles, it will be understood that embodiments are not limited to automobiles. In one or more implementations, the vehicle 200 may be a watercraft, an aircraft or any other form of motorized transport.

In some arrangements, the vehicle 200 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 200 can be highly automated. In one or more arrangements, the vehicle 200 can be a conventional vehicle in which a majority of or all of the navigation and/or maneuvering of the vehicle is performed by a human driver.

The vehicle 200 can include various elements. Some of the possible elements of the vehicle 200 are shown in FIG. 2 and will now be described. It will be understood that it is not necessary for the vehicle 200 to have all of the elements shown in FIG. 2 or described herein. The vehicle 200 can have any combination of the various elements shown in FIG. 2. Further, the vehicle 200 can have additional elements to those shown in FIG. 2. In some arrangements, vehicle 200 may not include one or more of the elements shown in FIG. 2. Further, while the various elements are shown as being located within the vehicle 200 in FIG. 2, it will be understood that one or more of these elements can be located external to the vehicle 200. Further, the elements shown may be physically separated by large distances.

The vehicle 200 can include one or more processors 210. The above description of the one or more processors 110 is equally applicable to the one or more processors 210. In some arrangements, the one or more processors 210 can be and/or can include the one or more processors 110. In one or more arrangements, one or more processors 210 can be a main processor of the vehicle 200. For instance, one or more processors 210 can be an electronic control unit (ECU) or an engine control unit.

The vehicle 200 can include one or more data stores 220 for storing one or more types of data. The above description of the one or more data stores 120 is equally applicable to the one or more data stores 220. In some arrangements, the one or more data stores 120 can be and/or can include the one or more data stores 220. The data store(s) 220 can be a component of the processor(s) 210, or the data store(s) 220 can be operatively connected to the processor(s) 210 for use thereby.

The vehicle 200 can include one or more transceivers 230. As used herein, "transceiver" is defined as a component or a group of components that transmit signals, receive signals or transmit and receive signals, whether wirelessly or through a hard-wired connection. The one or more transceivers 230 can be operatively connected to the one or more processors 210 and/or the one or more data stores 220. The one or more transceivers 230 can enable communications between the vehicle 200 and other elements of the system 100. The one or more transceivers 230 can be any suitable transceivers used to access a network, access point, node or other device for the transmission and receipt of data.

The one or more transceivers 230 may be wireless transceivers using any one of a number of wireless technologies. Examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The one or more transceivers 230 can include any wireless technology developed in the future. Again, the one or more transceivers 230 can be any suitable combination of transceivers, including any combination of the transceivers noted above.

The vehicle 200 can include a sensor system 240. The sensor system 240 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time.

In arrangements in which the sensor system 240 includes a plurality of sensors, the sensors can work independently from each other. Alternatively, two or more of the sensors can work in combination with each other. In such case, the two or more sensors can form a sensor network. The sensor system 240 and/or the one or more sensors can be operatively connected to the processor(s) 210, the data store(s) 220, and/or other element of the vehicle 200 (including any of the elements shown in FIG. 1). The sensor system 240 can acquire data of at least a portion of the external environment of the vehicle 200.

The sensor system 240 can include any suitable type of sensor. Various examples of different types of sensors will be described herein. However, it will be understood that the embodiments are not limited to the particular sensors described.

The sensor system 240 can include one or more vehicle sensors 241. The vehicle sensor(s) 241 can be configured to detect, determine, assess, monitor, measure, quantify and/or sense information about the vehicle 200 itself. For instance, the vehicle sensor(s) 241 can be configured to detect, determine, assess, monitor, measure, quantify and/or sense position and orientation changes of the vehicle 200, such as, for example, based on inertial acceleration. In one or more arrangements, the vehicle sensor(s) 241 can include one or more accelerometers, one or more gyroscopes, an inertial measurement unit (IMU), a dead-reckoning system, a global navigation satellite system (GNSS), and/or other suitable sensors. The vehicle sensor(s) 241 can be configured to detect, determine, assess, monitor, measure, quantify, and/or sense one or more characteristics of the vehicle 200. In one or more arrangements, the vehicle sensor(s) 241 can include a speedometer (not shown). The speedometer can determine a current speed of the vehicle 200, or data acquired by the speedometer can be used to determine a current speed of the vehicle 200. In one or more arrangements, the vehicle sensor(s) 241 can include a yaw rate sensor, an attitude angle sensor, and/or an RPM sensor, just to name a few possibilities. In one or more arrangements, the vehicle sensor(s) 241 can include a timer, a clock, and/or any other device to measure time and/or acquire temporal data in any suitable manner.

In one or more arrangements, the vehicle sensor(s) 241 can include one or more sensors configured to detect, determine, assess, monitor, measure, quantify, and/or sense a position of a steering wheel of the vehicle 200 (e.g., a rotation angle of the steering wheel), the speed for each individual wheel of the vehicle 200, the speed of the vehicle 200, a position of an accelerator pedal of the vehicle 200, and/or a position of a brake pedal of the vehicle 200, just to name a few possibilities.

The sensor system 240 can include one or more microphones 242. "Microphone" is any device, component, system, and/or instrument that at least converts received sound data into electrical signals. Sound data can include sounds that are perceptible to the human sense of hearing and/or sounds that are not perceptible to the human sense of hearing. The sound data can be in any suitable form. The one or more microphones 242 can be a part of the vehicle voice interface 201. It will be appreciated that the remote voice interface 202 can also include one or more of the microphones 242.

The one or more microphones 242 can be located in any suitable portion of the vehicle 200. For instance, one or more of the microphones 242 can be located within the vehicle 200 (e.g., in a vehicle occupant area). One or more of the microphones 242 can be located on the exterior of the vehicle 200. One or more of the microphones 242 can be located on or exposed to the exterior of the vehicle 200. One or more of the microphones 242 can be located proximate to one or more of the vehicle systems 260 or components thereof (e.g., shock absorbers, brakes, wheels, engine, etc.). When a plurality of microphones 242 is provided, the microphones can be distributed about the vehicle 200 in any suitable manner. In some instances, a plurality of microphones can be provided in a microphone array.

The position of one or more of the microphones 242 can be fixed such that its position does not change relative to the vehicle 200. One or more of the microphones 242 can be movable so that its position can change to allow audio data from different portions of the external environment of the vehicle 200 to be captured. The movement of one or more microphones 242 can be achieved in any suitable manner. The one or more microphones 242 and/or the movements of the one or more microphones 242 can be controlled by the sensor system 240, the processor 210 and/or any one or more elements of the vehicle 200.

Alternatively or in addition, the sensor system 240 can include one or more driving environment sensors. The driving environment sensors can be configured to acquire, detect, determine, assess, monitor, measure, quantify and/or sense driving environment data. "Driving environment data" includes and data or information about the external environment in which a vehicle is located or one or more portions thereof. For example, the driving environment sensors can be configured to detect, determine, assess, monitor, measure, quantify and/or sense, directly or indirectly, the presence of one or more objects in the external environment of the vehicle 200 and/or information/data about such objects (e.g., the position of each detected object relative to the vehicle 200, the distance between each detected object and the vehicle 200 in one or more directions, the speed of each detected object and/or the movement of each detected object). Examples of driving environment sensors can include RADAR sensor(s) 223, LIDAR sensor(s) 224, sonar sensor(s) 225, and/or camera(s) 226. The camera(s) 226 can be configured to capture visual data. "Visual data" includes video and/or image information/data. The camera(s) 226 can be high resolution cameras. The camera(s) 226 can capture visual data in any suitable wavelength of the electromagnetic spectrum. Alternatively or in addition to one or more of the above examples, the sensor system 240 can include one or more sensors configured to detect, determine, assess, monitor, measure, quantify and/or sense the location of the vehicle 200 and/or the location of objects in the environment relative to the vehicle 200. Any suitable sensor can be used for such purposes. Such sensors may work independently and/or in combination with a positioning system of the vehicle 200.

The vehicle 200 can include an input system 250. An "input system" is defined as any device, component, system, element or arrangement or groups thereof that enable information/data to be entered into a machine. The input system 250 can receive an input from a vehicle occupant (e.g., a driver or a passenger). Any suitable input system 250 can be used, including, for example, a keypad, display, touch screen, multi-touch screen, button, joystick, mouse, trackball, microphone and/or combinations thereof.

According to arrangements herein, the input system 250 can be configured to receive voice inputs from one or more vehicle occupants 150. In some instances, the input system 250 can be continuously monitoring for any voice data from a vehicle occupant 150. In some instances, the input system 250 can be configured to monitor for a particular identifier from a vehicle occupant 150 before voice inputs 170 are received from the vehicle occupant(s) 150. The identifier may be word(s), phrase(s), letter(s), number(s), and/or combinations thereof, just to name a few possibilities. The identifier can be assigned by a vehicle occupant, a vehicle owner, or some other entity.

The vehicle 200 can include an output system 255. An "output system" is defined as any device, component, system, element or arrangement or groups thereof that enable information/data to be presented to a vehicle occupant (e.g., a person, a vehicle occupant, etc.). The output system 255 can present information/data to a vehicle occupant. The output system 255 can include a display. Alternatively or in addition, the output system 255 may include a microphone, earphone and/or speaker. Some components of the vehicle 200 may serve as both a component of the input system 250 and a component of the output system 255.

The vehicle 200 can include one or more vehicle systems 260. Various examples of the one or more vehicle systems 260 are shown in FIG. 2. However, the vehicle 200 can include more, fewer, or different vehicle systems. It should be appreciated that although particular vehicle systems are separately defined, each or any of the systems or portions thereof may be otherwise combined or segregated via hardware and/or software within the vehicle 200. The vehicle 200 can include a propulsion system 261, a braking system 262, a steering system 263, throttle system 264, a transmission system 265, a signaling system 266, a navigation system 267, and/or a climate control system 268. Each of these systems can include one or more mechanisms, devices, elements, components, systems, and/or combination thereof, now known or later developed.

The vehicle 200 can include various modules, at least some of which will be described herein. The modules can be implemented as computer readable program code that, when executed by a processor, implement one or more of the various processes described herein. One or more of the modules can be a component of the processor 110, or one or more of the modules can be executed on and/or distributed among other processing systems to which the processor 110 is operatively connected. The modules can include instructions (e.g., program logic) executable by one or more processor 110. Alternatively or in addition, one or more data store 120, 220 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In one or more arrangements, the vehicle 200 can include the one or more voice input analysis modules 130 or at least a portion of one or more voice input analysis modules 130. The above description of the voice input analysis module(s) 130 presented in connection with FIG. 1 is equally applicable here. While FIG. 2 shows the vehicle 200 as having the voice input analysis module(s) 130, it will be understood that arrangements are not limited in this regard. Indeed, in some instances, the vehicle 200 may not include the voice input analysis module(s) 130. Instead, the voice input analysis module(s) 130 can be located remote from the vehicle 200; however, the vehicle 200 can be operatively connected to the voice input analysis module(s) 130.

When the vehicle 200 is an autonomous vehicle, the vehicle 200 can include one or more autonomous driving modules 270. The autonomous driving module(s) 270 can be configured to perform various functions, including, for example, environment perception, planning/decision-making, and/or control.

The autonomous driving module(s) 270 can receive data from the sensor system 240 and/or any other type of system capable of capturing information relating to the external environment surrounding a vehicle. The autonomous driving module(s) 270 can use such data to create a background map format, including information specific to both stationary and moving objects such as traffic signs, natural objects, moving vehicles, pedestrians, or other localized position data and/or signals, and output corresponding data and/or signals to the processor(s) 210. The autonomous driving module(s) 270 can determine vehicle position and velocity data. The autonomous driving module(s) 270 can determine the location of obstacles, objects, or other environmental features including traffic signs, trees, shrubs, neighboring vehicles, pedestrians, etc. One or more of the vehicle systems 260 can be operatively connected to the autonomous driving module(s) 270. The autonomous driving module(s) 270 can be configured to receive, capture, and/or determine data indicative of performance of the vehicle systems 260.

The autonomous driving module(s) 270 can be configured to receive, acquire, capture, and/or determine location information for objects within the environment surrounding the vehicle 200 for use by the processor(s) 210 and/or other element(s) of the vehicle 200. The autonomous driving module(s) 270 can estimate position and orientation of the vehicle 200, images for processing by an image sensor, vehicle position in global coordinates based on signals from a plurality of satellites, or any other data and/or signals that could be used to determine the current state of the vehicle 200 or to determine the position of the vehicle 200 in respect to its environment for use in either creating a map format or determining the position of the vehicle 200 with respect to the map format.

The autonomous driving module(s) 270 can be configured to determine path(s), current driving maneuvers for the vehicle 200, future driving maneuvers and/or modifications to current driving maneuvers based on data acquired by the sensor system 240, scene models, and/or data from any other suitable source. In some arrangements, the autonomous driving module(s) 270 can determine one or more potential driving maneuvers for the vehicle 200 at any point in time. "Driving maneuver" means one or more actions that affect the movement of a vehicle. Examples of driving maneuvers include: accelerating, braking, turning, moving in a lateral direction of the vehicle 200, changing travel lanes, merging into a travel lane, and/or reversing, just to name a few possibilities.

The processor(s) 210 and/or the autonomous driving module(s) 270 may be operable to control the navigation, maneuvering, and/or other aspects of the vehicle 200 by, directly or indirectly, controlling one or more of the vehicle systems 260 and/or components thereof. For instance, when operating in an autonomous mode, the processor(s) 210 and/or the autonomous driving module(s) 270 can control the direction and/or speed of the vehicle 200. The processor(s) 210 and/or the autonomous driving module(s) 270 can cause, directly or indirectly, the vehicle 200 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The autonomous driving module(s) 270 can be configured to execute various vehicle functions and/or to transmit data to, receive data from, interact with, and/or control the vehicle 200 or one or more systems thereof (e.g., one or more of vehicle systems 260). The processor(s) 210 and/or the autonomous driving module(s) 270 can be operatively connected to communicate with the vehicle systems 260 and/or individual components thereof. For example, the processor(s) 210 and/or the autonomous driving module(s) 270 can be in communication to send and/or receive information from the various vehicle systems 260 to control the movement, speed, steering, accelerating, braking, maneuvering, heading, direction, etc. of vehicle 200. The processor(s) 210 and/or the autonomous driving module(s) 270 may control all of these vehicle systems 260 or some subset thereof and, thus, may be partially or fully autonomous.

In some instances, the vehicle 200 can include one or more actuators 275. The actuators 275 can be any element or combination of elements operable to modify, adjust and/or alter one or more systems vehicle systems 260 or components thereof to responsive to receiving signals or other inputs from the processor(s) 210 and/or the autonomous driving module(s) 270. Any suitable actuator can be used. For instance, the one or more actuators 275 can include motors, pneumatic actuators, hydraulic pistons, relays, solenoids, and/or piezoelectric actuators, just to name a few possibilities.

The processor(s) 210 and/or the autonomous driving module(s) 270 may be operable to control the navigation, maneuvering, and/or other aspects of the vehicle 200 by, directly or indirectly, controlling one or more of the vehicle systems 260 and/or components thereof. For instance, when operating in an autonomous mode, the processor(s) 210 and/or the autonomous driving module(s) 270 can control the direction and/or speed of the vehicle 200. The processor(s) 210 and/or the autonomous driving module(s) 270 can cause, directly or indirectly, the vehicle 200 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

In some instances, the vehicle 200 may not be an autonomous vehicle. In such instances, the vehicle 200 may not have autonomous driving module(s) 270, but it could have one or more control module(s) instead. The control module(s) and/or the processor(s) 210 may be operable to control one or more aspects of the vehicle 200 by, directly or indirectly, controlling one or more of the vehicle systems 260 and/or components thereof. For instance, the processor(s) 210 and/or the control module(s) can control the climate within the vehicle 200, lock and unlock doors of the vehicle 200, start the vehicle 200, etc. The processor(s)

210 and/or the control module(s) can cause, directly or indirectly, the vehicle 200 to implement machine-intended content 172.

It should be noted that, in at least some instances, the vehicle 200 can be a machine recipient of machine-intended content 172. Of course, there can be other machine recipients, including any of those mentioned herein. However, it will be appreciated that machine recipient can include various elements, one or more processors, one or more data stores, one or more transceivers, one or more systems, one or more control modules, and one or more actuators. Thus, the above discussion of such elements in connection with the vehicle 200 is applicable to other machine recipients. As an example, a smart house may have one or more processors, one or more data stores, one or more systems (e.g., climate control system, garage door system, door lock system, security system, one or more appliances, etc.), one or more control modules, and one or more actuators.

Now that the various potential systems, devices, elements and/or components have been described, various methods of using such systems, devices, elements and/or components will now be described. Referring now to FIG. 3, an example of a method 300 a method of processing voice inputs is shown. Various possible steps of method 300 will now be described. The method 300 illustrated in FIG. 3 may be applicable to the embodiments described above in relation to FIGS. 1-2, but it is understood that the method 300 can be carried out with other suitable systems and arrangements. Moreover, the method 300 may include other steps that are not shown here, and in fact, the method 300 is not limited to including every step shown in FIG. 3. The steps that are illustrated here as part of the method 300 are not limited to this particular chronological order. Indeed, some of the steps may be performed in a different order than what is shown and/or at least some of the steps shown can occur simultaneously.

At block 310, a voice input 170 can be received from a user (e.g., a person). The voice input may be provided by a person speaking in a normal voice and/or using his or her regular vocabulary. The voice input 170 can be received at the voice interface. For example, the voice input 170 can be received by the input system 250 and/or one or more microphones 242 of the sensor system 240. In one or more arrangements, the voice interface can be located within a vehicle, which may or may not be in operation. "In operation" includes instances in which the vehicle 200 is in motion, as well as when the vehicle 200 is stopped or standing while at least a portion of the vehicle 200 is activated. The voice input 170 can be received while the vehicle is off. In one or more arrangements, the voice input 170 can be received directly from a human user at the vehicle voice interface. In one or more arrangements, the voice input 170 can be received indirectly from a human user at the vehicle voice interface, such as from a remote computing device (e.g., a computer, a tablet computer, a smart phone, etc.). The method 300 can continue to block 320.

At block 320, the received voice input 170 can be analyzed to determine whether it includes human-intended content 171 and/or machine-intended content 172. The analysis can be performed by, for example, the processor(s) 110, the processor(s) 210, and/or the voice input analysis module(s) 130. In one or more arrangements, the analysis is not performed in real-time. However, in one or more arrangements, the analysis may be performed in real-time. The analysis can be performed onboard the vehicle 200 or in a remote computing system (e.g., a cloud-based server, a remote computing system, etc.). Any suitable analysis can be performed. For example, the analysis can be performed using natural language processing. In one or more arrangements, the natural language processing can be performed with respect to a predefined limited vocabulary. In some instances, words that are included in the predefined limited vocabulary are analyzed. Words that are not included in the predefined limited vocabulary can be filtered, ignored, or otherwise excluded. The method 300 can continue to block 330.

At block 330, responsive to determining that the received voice input 170 includes human-intended content 171, a human recipient 160 for the human-intended content 171 can be identified. In one or more arrangements, the human recipient 160 can be identified within the voice input 170 itself, such as by detecting an indicator or identifier associated with a person (e.g., name(s), key word(s), and/or term associated with a particular person).

A message 180 can be sent to the identified human recipient. The message 180 can include the human-intended content 171. For instance, the human-intended content 171 can be included as an attachment to the message 180. In one or more arrangements, the human-intended content 171 can be provided in an audio form (e.g., as an audio file 182). In one or more arrangements, the message 180 can include directions or instructions as to how and/or where the human-intended content 171 can be accessed. For example, the message 180 can include a hyperlink that, when selected, will direct a user to the human-intended content 171, which can be stored in one or more data stores 120 or 220 as, for example, an audio file. The identifying of the human recipient and/or the sending of the message 180 can be performed by, for example, the processor(s) 110, the processor(s) 210, and/or the voice input analysis module(s) 130. In one or more arrangements, the identifying of the human recipient and/or the sending of the message 180 is not performed in real-time. In one or more arrangements, the identifying of the human recipient and/or the sending of the message 180 may be performed in real-time. The method 300 can continue to block 340.

At block 340, responsive to determining that the received voice input 170 includes machine-intended content, a machine recipient for the machine-intended content can be identified. In one or more arrangements, the machine recipient can be identified within the voice input 170 itself, such as by detecting an indicator or identifier associated with a particular machine (e.g., name(s), key word(s), and/or other term associated with a particular machine).

A message 184 can be sent to the identified machine recipient. The message 184 can include the machine-compatible content 186. The machine-compatible content 186 can be provided in any suitable format that can be processed by the identified machine recipient. The message 184 can be sent to the identified machine recipient, which can implement the machine-compatible content 186. The identifying and/or the sending can be performed by, for example, the processor(s) 110, the processor(s) 210, and/or the voice input analysis module(s) 130. In one or more arrangements the identifying of the machine recipient and/or the sending of the message 184 is not performed in real-time. In one or more arrangements, the identifying of the machine recipient and/or the sending of the message 184 may be performed in real-time.

The method 300 can end. Alternatively, the method 300 can return to block 310 or to some other block. The method 300 can be repeated at any suitable point, such as at a suitable time or upon the occurrence of any suitable event or condition. As a further alternative, the method 300 can include additional and/or alternative blocks (not shown). For instance, the method 300 can include generating an audio file including the human intended content. The message 180 that includes the human intended content can include the audio file, such as an attachment. In one or more arrangements, the human intended content is not converted to text. In some instances, the method 300 can include converting the machine intended content into a format that is compatible for processing by the identified machine recipient.

Various examples in accordance with systems and methods described herein will now be presented. It will be understood that these examples are provided merely to facilitate the description and are not intended to be limiting.

In a first example, a voice interface can be provided within a vehicle. The vehicle can be in operation. A driver can be driving the vehicle. The driver may wish to send a mixed recipient communication (e.g., to an entity and to a person). For this example, the driver would like to send a command to a smart house (e.g., a house in which one or more systems of the house are controlled by a computer) to take some action (e.g., heat/cool the house). The driver may also wish to send a message to person who is currently unavailable for a telephone call. In such case, the driver can speak aloud in his or her normal voice and a normal rate. The driver may say something like "Ryan C do not forget to pick up bread on your way home from work. House set thermostat to 72 degrees." The driver's speech can be acquired by the vehicle voice interface 201 (e.g., one or more microphones 242) as a voice input 170.

The received voice input 170 can be analyzed by the voice input analysis module(s) 130. For instance, the received voice input 170 can be analyzed to determine it includes human-intended content 171 and/or machine-intended content 172. The analysis can be performed by, for example, the processor(s) 110, the processor(s) 210, and/or the voice input analysis module(s) 130. The analysis can be performed onboard the vehicle 200 or in a remote computing system (e.g., a cloud-based server, a remote computing system, etc.). The received voice input 170 can be analyzed using natural language processing with respect to a predefined vocabulary. In this example, the word "house" can be recognized by the voice input analysis module(s) 130 as a machine recipient indicator. For instance, the user may have the term "House" designated as a recipient indicator in the contact information. As a result, the portion of the voice input 170 associated with this recipient indicator can be determined to be machine-intended content. The voice input analysis module(s) 130 can be configured to assume that the voice input 170 that follows the recipient indicator is intended for the "house" unless and until another recipient indicator is detected. Further, the phrase "Ryan C" can be recognized by the voice input analysis module(s) 130 as a human recipient indicator. For instance, the user may have the term "Ryan C" designated as a recipient indicator in the contacts data 122. As such, the portion of the voice input 170 associated with "Ryan C" can be determined to be human-intended content 171. Again, the voice input analysis module(s) 130 can be configured to assume that the voice input 170 that follows this recipient indicator is intended for "Ryan C" unless and until another recipient indicator is detected.

Since, in this example, the voice input analysis module(s) 130 has determined that the voice input 170 includes human-intended content 171, the human-intended content 171 ("do not forget to pick up bread on your way home from work") can be converted, stored as, recorded as, or otherwise made into an audio file and/or in an audio format. Notably, the human-intended content 171 is not converted to text. As a result, the voice input analysis module(s) 130 is not overburdened with such conversion, and the driver does not have to review any text to ensure accuracy, thereby streamlining the process and preventing driver distractions.

The recipient indicator "Ryan C" can be used to identify the human recipient. For instance, the voice input analysis module(s) 130 can search or query the data store(s) 220 and/or 120, including the contacts data 122, to for contact information about the person associated with the recipient indicator. A message 180 can be sent to the "Ryan" using the contacts data 122 associated with "Ryan C." The contacts data 122 may include preferences or instructions for "Ryan C," indicating a preferred mode of communication, preferred audio file format, and/or associated contact information. Here, the contacts data 122 can indicate that text message is the preferred mode of communication and the contact's phone number can be included. Accordingly, a text message can be sent to the "Ryan C." The text message itself may be blank, or it can include a predetermined message (e.g., "Hi [recipient] please listen to the attached audio file.").

The contacts data 122 can indicate that MP3 is the preferred audio file format for "Ryan C." The audio file can be attached to or otherwise included with the text message. The identifying and/or the sending can be performed by, for example, the processor(s) 110, the processor(s) 210, and/or the voice input analysis module(s) 130. The recipient— "Ryan C"—can receive the text message and listen to the audio file.

Since, in this example, the voice input analysis module(s) 130 has determined that the received voice input 170 also includes machine-intended content, a machine recipient for the machine-intended content can be identified within the voice input 170. The recipient indicator "House" can be used to identify the machine recipient. For instance, the voice input analysis module(s) 130 can search, query and/or access the data store(s) 220 and/or 120, including the contacts data 122, for contact information about the machine associated with the recipient indicator. The contact information may include preferences or instructions for communication with the contact, indicating a preferred mode of communication and associated contact information.

The machine intended content can be converted into a format that is compatible for processing by the smart house. In addition, a message 284 including the machine-compatible content 286 ("set thermostat to 72 degrees") can be sent to the smart house for implementation of the machine-intended content 172. The converting and/or the sending can be performed by, for example, the processor(s) 110, the processor(s) 210, and/or the voice input analysis module(s) 130.

Thus, the smart house can receive the message 284. One or more controller modules and/or one or more processors of the smart house can process the machine-compatible content 186 of the message 184. Here, one or more controller modules and/or one or more processors of the smart house can directly or indirectly control a climate control system of the smart house or a component thereof (e.g., a thermostat). The one or more controller modules and/or one or more processors can cause the thermostat to be set to 72 degrees.

As another example, a driver may notice something different about the performance of the vehicle 200. For instance, the driver may hear an unusual noise coming from a certain part of the vehicle. In such case, the driver can provide a voice input 170 with at least machine-intended content 172. The machine-intended content 172 can one or more vehicle diagnostic commands. Vehicle diagnostic commands can include commands to acquire data that relates to a perceived or potential problem with the vehicle 200 and/or to an unusual occurrence relating to or encountered by the vehicle 200. Vehicle diagnostic commands can include commands that to acquire data relating to the performance of the vehicle or an element, system, or component thereof. Vehicle diagnostic commands can include commands to acquire data relating to improving the performance of the vehicle or to an element, system, device, and/or component thereof. In some instances, the voice input 170 can also include human-intended content 171. Here, the human-intended content 171 can be a note to the driver himself or herself, or it can be a note for review by another person or entity. The human-intended content 171 can be provided as, for example, an audio file to such recipients. For instance, the acquired data and/or the driver's comments can be reviewed by an automotive service center to determine whether this is a problem with the vehicle 200. Further details of such an example is presented in U.S. patent application Ser. No. 14/886,288, which is incorporated herein by reference in its entirety.

While the above example is made with respect to a person directly interacting with a vehicle voice interface 201 inside of the vehicle 200, it will be appreciated that a user may interact with the vehicle voice interface remotely from the vehicle 200. As an example, the user may have a portable communication device that provide a remote voice interface 202, which can be communicatively linked to the vehicle voice interface 201. Voice inputs 170 provided at the remote voice interface 202 can be sent to the vehicle voice interface 201.

In some arrangements, a part of a voice input 170 may be just for listening (not for automatic processing), and another part may be for carrying specific instructions. For example, the listen-only part might start with the word "Listen", followed by the audio message. The instruction part might start with the word "Instructions", followed by the instructions in a natural voice.

It should be noted that the voice input 170 can include any combination of human-intended content 171 and/or machine-intended content 172. In some instances, the voice input 170 can include human-intended content 171 only. In such case, the human-intended content 171 may be for one or more human recipients 160. In other instances, the voice input 170 can include machine-intended content 172 only. In such case, the machine-intended content 172 can be for one or more machine recipients 162. In some cases in which the voice input includes both human-intended content 171 and machine-intended content 172, the human-intended content 171 and the machine-intended content 172 may be sent to effectively the same place. For instance, the machine recipient 162 can be a computer at a restaurant, and the human recipient 160 can be a human worker at the restaurant.

Various examples of human-intended content 171 that can be sent to a human recipient 160 as an audio file will be described. In one example, the human-intended content 171 can be a pizza order for a particular pizzeria. The human recipient 160 can be identified as a worker at the pizzeria who can listen to the audio file and act accordingly. In such case, the exact identity of the worker does not need to be known. The message 180 with the audio file 182 containing the human-intended content 171 can be sent to a main contact number or email address. As another example, the human-intended content 171 can be a reminder to another person, who may not be currently available, to purchase something at a store (e.g. "Mrs. Y don't forget to buy milk before I come home."). As a further example, the human-intended content 171 can be a comment or message to a current human occupant of the vehicle 200, who may or may not be the person providing the voice input 170. For instance, the driver of the vehicle 200 may go into a store while another person waits in the vehicle 200. In such case, the driver may provide a voice input 170 using the remote voice interface 202 on his or her portable communication device. The voice input 170 can be sent to the vehicle voice interface 201. The comment or message for the current occupant of the vehicle 200 can be provided as an audio output on the output system 255 of the vehicle 200. As another example, a person may wish to set a reminder for himself or herself (e.g., "Self . . . remember to pay cell phone bill tomorrow."). In such an example, sending the message to the human recipient can include sending a text and/or email message to the user himself or herself. Alternatively or in addition, sending the message to the human recipient can include sending or generating an entry for an electronic calendar entry with the human-intended content 171, which can be attached as an audio file and/or a hyperlink can be provided to direct the person to the human-intended content 171.

Various examples of machine-intended content 172 that can be sent to a machine recipient 162 will be described. In one example, the machine-intended content 172 can be an order to a restaurant to have something prepared and/or delivered. An example of such machine-intended content 172 can include: "Pizza Place X: please deliver my usual pizza to my house by 8 o'clock, charge my credit card on file." Alternatively or in addition, payment information from the payment data 123 and/or pizza toppings for "my usual pizza" from the preferences data 124 can be included in the message 184 to pizzeria. In another example, a machine-intended content 172 can be sent to a store to have something delivered. In another example, the machine-intended content 172 can be sent to a vehicle to take some action (e.g., remote start, lock/unlock, activate climate control to specified parameters, set the radio to a particular station, turn on windshield wipers, turn on the front and/or rear defrost, etc.). In another example, the machine-intended content 172 can be: "[Smart] House, please set temperature to X degrees by Y hours" or "[Smart] Oven, heat up to Z degrees by B hours."

It will be appreciated that arrangements described herein can provide numerous benefits, including one or more of the benefits mentioned herein. For example, arrangements described herein can enable effective communications between a vehicle occupant and a vehicle. Arrangements described herein can facilitate the use of natural language communications between a vehicle occupant and the vehicle, while keeping the driver focused on the primary task of the safely operating the vehicle. Arrangements described herein can provide convenience for a vehicle occupant by providing a voice interface to initiate one or more commands (e.g., vehicle operational data recording). Arrangements described herein may improve safety, as a vehicle occupant (especially the driver) can provide commands and/or comments hands-free while the vehicle is in operation, thereby keeping the focus on the road. The driver can avoid texting, which can be dangerous. Arrangements described herein can provide a degree of automation that minimizes manual supervision and that can minimize latency between the speaking action and its outcome. For instance, a driver does not have to review the content of a message because arrangements herein provide a message without converting the message into another format (e.g., the driver's voice input is not converted to text). Further, in arrangements in which the voice interface is a non-real-time voice interface, the cognitive load on the driver is low. A non-real time voice interface according to arrangements herein can still have an attractively low latency by capitalizing on ever growing computer speed of processing and communication bandwidth.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing.

In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of processing voice inputs, the method comprising:
 receiving a voice input from a user;
 analyzing, using a processor, the received voice input for human-intended content and machine-intended content;
 when the voice input includes human-intended content:
  identifying within the voice input a human recipient for the human-intended content; and
  sending a message to the identified human recipient, the message including the human-intended content in an audio form; and
 when the voice input includes machine-intended content:
  identifying within the voice input a machine recipient for the machine-intended content; and
  sending a message including the machine-intended content to the identified machine recipient, whereby the machine-intended content is processed for implementation by the identified machine recipient.

2. The method of claim 1, wherein analyzing the received voice input to determine whether the voice input includes at least one of human-intended content or machine-intended content includes analyzing the received voice input using natural language processing.

3. The method of claim 1, wherein receiving the voice input includes receiving the voice input directly from a human user at voice interface located onboard a vehicle.

4. The method of claim 1, wherein receiving the voice input includes receiving the voice input indirectly from a human user at a remote voice interface.

5. The method of claim 1, further including generating an audio file including the human intended content, and wherein the message includes the audio file.

6. The method of claim 1, wherein the human intended content is not converted to text.

7. The method of claim 1, further including converting the machine intended content into a format that is compatible for processing by the identified machine recipient.

8. A voice input system comprising:
   a voice interface configured to receive voice inputs from a human user, the voice interface including one or more microphones; and
   one or more processors operatively connected to receive voice inputs from the voice interface, the one or more processors being programmed to initiate executable operations comprising:
      analyzing a received voice input for human-intended content and machine-intended content;
      when the voice input includes human-intended content:
         identifying within the voice input a human recipient for the human-intended content; and
         sending a message to the identified human recipient, the message including the human-intended content in an audio form, and
      when the voice input includes machine-intended content:
         identifying within the voice input a machine recipient for the machine-intended content; and
         sending a message including the machine-intended content to the identified machine recipient, whereby the machine-intended content is processed for implementation by the identified machine recipient.

9. The system of claim 8, wherein analyzing the received voice input for human-intended content and machine-intended content includes analyzing the received voice input using natural language processing.

10. The system of claim 8, wherein the voice interface is located onboard a vehicle, and wherein the voice input is received directly from a vehicle occupant at the voice interface.

11. The system of claim 8, wherein the voice interface is located onboard a vehicle, and wherein the voice input is received indirectly from a human user at a remote voice interface communicatively linked to the voice interface.

12. The system of claim 8, further including generating an audio file including the human intended content, and wherein the message includes the audio file.

13. The system of claim 8, wherein the human intended content is not converted to text.

14. The system of claim 8, further including converting the machine intended content into a format that is compatible for processing by the identified machine recipient.

15. A vehicle comprising:
   a voice interface located onboard the vehicle, the voice interface being configured to receive voice inputs; and
   a processor operatively connected to receive voice inputs from the voice interface, the processor being programmed to initiate executable operations comprising:
      receiving a voice input from the voice interface;
      analyzing, using natural language processing, the received voice input for human-intended content and machine-intended content;
      when the voice input includes human-intended content:
         identifying within the voice input a human recipient for the human-intended content;
         generating an audio file including the human intended content of the voice input; and
         sending a message to the identified human recipient, the message including the audio file, wherein the human intended content is not converted to text; and
      when the voice input includes machine-intended content:
         identifying within the voice input a machine recipient for the machine-intended content;
         converting the machine-intended content into a format that is compatible for processing by the identified machine recipient; and
         sending a message including the converted machine-intended content to the identified machine recipient, whereby the machine-intended content is processed for implementation by the identified machine recipient.

16. The vehicle of claim 15, wherein the voice interface is configured to receive voice inputs directly from a vehicle occupant at the voice interface.

17. The vehicle of claim 15, wherein the voice interface is configured to receive voice inputs indirectly from a human user at a remote computing device communicatively linked to the voice interface.

18. The vehicle of claim 15, wherein the voice interface includes one or more microphones.

19. A computer program product for processing voice inputs, the computer program product comprising a non-transitory computer readable storage medium having program code embodied therein, the program code executable by a processor to perform a method comprising:
   analyzing a received voice input for human-intended content and machine-intended content;
   when the voice input includes human-intended content:
      identifying within the voice input a human recipient for the human-intended content; and
      sending a message to the identified human recipient, the message including the human-intended content in an audio form; and
   when the voice input includes machine-intended content:
      identifying within the voice input a machine recipient for the machine-intended content; and
      sending a message including the machine-intended content to the identified machine recipient, whereby the machine-intended content is processed for implementation by the identified machine recipient.

20. The computer program product of claim 19, wherein analyzing the received voice input for human-intended content and machine-intended content includes analyzing the received voice input using natural language processing.

21. The system of claim 8, wherein analyzing the received voice input for human-intended content and machine-intended content is not performed in real-time.

22. The system of claim 8, wherein the machine-intended content includes user payment information.

23. The system of claim 8, wherein the machine-intended content includes user preference data.

24. The system of claim 8, wherein analyzing the received voice input for human-intended content and machine-intended content includes comparing the received voice input to a predefined limited vocabulary.

25. The system of claim 8, wherein the audio form is selected based on preference data associated with the identified human recipient.

* * * * *